United States Patent
Kato et al.

(10) Patent No.: US 8,155,618 B2
(45) Date of Patent: Apr. 10, 2012

(54) RECEIVING DEVICE FOR FREQUENCY MODULATED SIGNALS WITH VOLTAGE-LIMITED REFERENCE INPUT TO DEMODULATED SIGNAL BINARIZATION COMPARATOR

(75) Inventors: Hironori Kato, Anjo (JP); Gorou Inoue, Obu (JP); Takatoshi Sekizawa, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 816 days.

(21) Appl. No.: 12/219,318

(22) Filed: Jul. 18, 2008

(65) Prior Publication Data

US 2009/0023409 A1 Jan. 22, 2009

(30) Foreign Application Priority Data

Jul. 20, 2007 (JP) .................................. 2007-189408

(51) Int. Cl.
*H04B 1/16* (2006.01)
(52) U.S. Cl. ...................... 455/340; 455/205; 455/184.1; 455/293; 455/336; 455/337
(58) Field of Classification Search ..................... 455/68, 455/569.1, 212, 340, 205, 184.1, 293, 336, 455/337; 375/272; 381/7
See application file for complete search history.

(56) References Cited

U.S. PATENT DOCUMENTS

| 4,146,842 | A | * | 3/1979 | Fukushima et al. | .......... 455/212 |
| 4,419,541 | A | * | 12/1983 | Kishi et al. | .......... 381/7 |
| 6,745,055 | B1 | * | 6/2004 | Iyengar et al. | .......... 455/569.1 |
| 7,177,622 | B2 | * | 2/2007 | Oiwa et al. | .......... 455/340 |
| 2003/0091121 | A1 | * | 5/2003 | Kenmochi | .......... 375/272 |
| 2005/0191966 | A1 | * | 9/2005 | Katsuta | .......... 455/68 |

FOREIGN PATENT DOCUMENTS

| JP | 60186136 | A | * | 9/1985 |
| JP | 62189822 | A | * | 8/1987 |
| JP | 11-331005 |  |  | 11/1999 |
| JP | 2005-311657 |  |  | 11/2005 |
| JP | 2006-203614 |  |  | 8/2006 |

* cited by examiner

*Primary Examiner* — Junpeng Chen
(74) *Attorney, Agent, or Firm* — Nixon & Vanderhye PC

(57) ABSTRACT

A waveform shaping circuit wave-shapes a demodulated signal after FM demodulation to generate a binary value. A smoothing circuit smoothes the demodulated signal to generate a reference voltage. A comparator compares the reference voltage with the demodulated signal to output the binary value. A potential difference limiting circuit determines whether a potential difference between the demodulated signal and the reference voltage exceeds a set voltage. When the potential difference exceeds the set voltage, the potential difference is controlled to a value less than the set voltage. At the initiation of signal reception or after a jamming signal stops, the reference voltage follows the demodulated signal, thus allowing data reception to rapidly begin.

11 Claims, 6 Drawing Sheets

RECEIVING DEVICE FOR FREQUENCY MODULATED SIGNALS WITH VOLTAGE-LIMITED REFERENCE INPUT TO DEMODULATED SIGNAL BINARIZATION COMPARATOR

CROSS-REFERENCE TO RELATED APPLICATION

The present application is based on and claims priority to Japanese Patent Application No. 2007-189408, filed on Jul. 20, 2007, the disclosure of which is incorporated herein by reference.

BACKGROUND INVENTION

1. Field of the Invention

The invention relates to a receiving device that receives a signal and more particularly to a receiving device that demodulates using frequency modulation (FM) demodulation, smoothes the demodulated signal to generate a reference voltage, compares the reference voltage with the demodulated signal, and generates a binary signal showing received data.

2. Description of the Related Art

A control system is conventionally known that can remotely control a control object unit by transmitting control data from a mobile device to the control object unit by radio. Specifically, for example, a keyless entry system for an automobile is known that uses a transmitter-receiver employing an FSK modulation method for transmission and reception of the control data.

The transmitter-receiver using the FSK modulation method transmits and receives an FM modulated wave generated by frequency-modulating a carrier wave with the control data, which is a binary signal, to be transmitted and received.

The receiving device frequency-converts the received signal into an intermediate frequency signal and FM-demodulates the intermediate frequency signal using an FM detector to generate a demodulated signal amounting to a voltage signal corresponding to the frequency of the received signal. The receiving device further waveform-shapes the demodulated signal to a binary signal in order to recover the binary signal corresponding to the control data used by a transmitter to frequency-modulate a carrier wave. Descriptions of such a receiver can be found, for example, in JP 2005-236556A and JP 2006-203614A.

In the exemplary receiving device a waveform-shaping circuit for binarizing the demodulated signal is constructed to compare the demodulated signal with a reference voltage to binarize the demodulated signal. However, when the reference voltage is kept constant, the control data may not be normally recovered due to influences such as frequency variations of the carrier wave generated at the transmitter side and of a local oscillating signal used for frequency conversion of the received signal into the intermediate frequency signal at the receiving device side or noise components superimposed in the demodulated signal.

As shown in FIG. 9A, a waveform-shaping circuit is known and is configured in such a manner that a demodulated signal is smoothed through a smoothing circuit 84 formed of a resistance R1 and a capacitor C1 to generate a reference voltage and the reference voltage and the demodulated signal are compared through a comparator 86 to generate a binary signal.

It should be noted that FIG. 9A is a schematic construction a circuit of the conventional receiving device constructed in such a manner that a low pass filter (LPF) 82 is arranged downstream of a FM detector 80 for FM-demodulating an intermediate frequency (IF) signal to eliminate high-frequency noise components from the demodulated signal. After noise elimination, the demodulated signal is separated into two lines, one of which is inputted into a converter 86 through an input resistance R10 and the other of which is inputted into the converter 86 through the smoothing circuit 84 formed of the resistance R1 and the capacitor C1.

In a case where the demodulated signal is smoothed to generate the reference voltage as described above, increasing the time constant of the smoothing circuit 84 causes ripples of the reference voltage to be made small, stably carrying out the binarization of the demodulated signal.

When the time constant of the smoothing circuit 84 is made large for stably carrying out the binarization of the demodulated signal however, time, from a point of starting reception of a transmitted electric wave from the transmitter to a point where the reference voltage reaches a voltage value corresponding to the demodulated signal, is increased. The response time until the data can be normally recovered is made longer.

As shown in FIG. 9B, since the FM detector 80 outputs a demodulated signal a voltage value of which changes in accordance with a frequency of a received signal, such as the IF signal, when a jamming signal exists within a frequency zone, such as the IF zone, in which the FM detector 80 can carry out the FM demodulation, a voltage value of the demodulated signal outputted from the FM detector 80 temporarily increases or decreases as compared to the demodulated signal only at the time of demodulating an object signal, which is contained in the received signal along with the jamming signal, if present.

When the demodulated voltage temporarily increases or decreases due to jamming, the reference voltage also varies likewise. Therefore, even if the jamming signal stops, rapid resumption of the data reception can not occur.

Specifically, when a frequency of the jamming signal is lower than that of the object signal, the demodulated signal is lower than a normal voltage value corresponding to the object signal and the reference voltage also decreases accordingly. In such a case, as shown in FIG. 9C, even if the jamming signal stops and the demodulated signal recovers back to a voltage value in accordance with the object signal, the reference voltage gradually increases with the time constant of the smoothing circuit 84. Therefore, even if a state of the demodulated signal varies to from a high level to a low level, or from a low level to a high level, in response to the received data, the output from the comparator 86 is fixed to a high level until the reference voltage increases to a voltage variation region of the demodulated signal.

More specifically, when the frequency of the jamming signal is higher than the object signal, the demodulated signal is higher than the normal voltage value corresponding to the object signal and the reference voltage also increases accordingly. In such a case, as shown in FIG. 9B, even if the jamming signal disappears and the demodulated signal recovers back to the normal voltage value in accordance with the object signal, the reference voltage gradually decreases with the time constant of the smoothing circuit 84. Therefore, even if the demodulated signal varies to a state from a high level to a low level or from a low level to a high level response to the received data, the output from the comparator 86 is fixed to a low level in the duration until the reference voltage decreases to the voltage variation region of the demodulated signal.

When the receiving device does not receive the transmitted electric wave from the transmitter, the output level from the FM detector 80 becomes low. Thereafter, when the reception of the transmitted electric wave from the transmitting device starts, as in the case where the jamming signal of the low frequency wave stops as shown in FIG. 9C, the output from the comparator 86 is fixed to a high level until the reference voltage increases to a voltage variation region of the demodulated signal. In consequence, the response time during which the data can be normally recovered is made longer.

On the other hand, such a problem is solved by making the time constant of the smoothing circuit 84 be small. However, when the time constant of the smoothing circuit 84 is made small, the voltage variation (ripple) of the reference voltage is made large. Therefore, the circuit is easily influenced by the noise superimposed in the demodulated signal and the binary signal (data) can not be recovered with high accuracy.

SUMMARY OF THE INVENTION

The invention is made in view of the foregoing and an object of the invention is to provide a receiving device that generates a reference voltage from a demodulated signal acquired by FM-demodulating a received signal and compares the reference voltage with the demodulated signal, thereby recovering a binary data signal. The exemplary receiving device can quickly start data reception or recovery of the binary signal at reception start or after cessation if a jamming signal without degradation of the recovery accuracy.

In order to achieve the above described and other objects, according to a first aspect of the invention, an FM detector FM-demodulates a received signal in a receiving device, a smoothing circuit smoothes the demodulated signal to generate a reference voltage, and a comparator compares the reference voltage with the demodulated signal to recover a binary signal modulated in accordance with a transmitting data from a transmitter. Further, the receiving device includes potential difference limiting means that limits a potential difference between the reference voltage and the demodulated signal to less than a set voltage.

According to a first aspect of the invention, when the reception of the transmitting signal from the transmitter starts or when the jamming signal superimposed in the demodulated signal stops, the demodulated signal rapidly changes into a voltage value in response to the object signal and therefore, the reference voltage does not possibly follow the voltage change of the demodulated signal through an operation of the smoothing circuit. Even in such a case, the potential difference limiting means makes the reference voltage follow the demodulated signal so that the potential difference between the reference voltage and the demodulated signal is less than the set voltage.

In consequence, according to the first aspect of the invention, by shortening a response time until the received signal is binarized at reception start or when the jamming signal stops, the data reception can quickly be started in order to recover the binary data signal.

When the potential difference between the reference voltage and the demodulated signal is less than the set-voltage, the reference voltage is supposed to be generated by the smoothing circuit. Therefore, as in the case of the conventional device, by increasing the time constant of the smoothing circuit, ripples of the reference voltage used at normal received are restricted, thus making it possible to secure recovery accuracy of the binary data signal.

The set voltage which the potential difference limiting means uses for controlling the potential difference between the demodulated signal and the reference voltage is set based upon a voltage variation width (i.e., magnitude of variation) of the demodulated signal acquired when the FM detector FM-demodulates the object signal.

The set voltage is set as described because, at reception start or when the jamming signal stops, when the potential difference between the demodulated signal and the reference voltage is larger than the potential variation width, the response time from a point when the demodulated signal recovers to the voltage value in accordance with the object signal, to a point where the reference voltage gets to within the voltage variation width of the demodulated signal is made long, making it possible to binarize the demodulated signal.

For securely shortening the above described response time, a voltage value smaller than a voltage variation width of the demodulated signal acquired when the FM detector FM-demodulates the object signal is set as the set voltage. For example, if the ripple of the reference voltage generated in the smoothing circuit is in the order of 10% of the voltage variation width of the demodulated signal, the set voltage may be set to a voltage value in the order of 0.55 to 0.7 times the voltage variation width of the demodulated signal.

In a case where the demodulated signal is a signal as a result of demodulating the object signal only, a central voltage between a low level and a high level of the demodulated signal may be set to the reference voltage and a voltage value which is one-second of the voltage variation width of the demodulated signal may be set to the set voltage for accurately binarizing the demodulated signal without occurrence of time strain.

However, since the reference voltage actually generated in the smoothing circuit has a ripple, the reference voltage does not become a constant voltage. When a voltage value that is one-half of the voltage variation width of the demodulated signal in the object signal is set to a set voltage, even the variation of the reference voltage generated in the smoothing circuit at a normal reception time is resultantly limited.

Where a voltage variation width of the demodulated signal in the object signal is Vs, a variation in magnitude (e.g., width or ripple) of the reference voltage generated in the smoothing circuit at a normal reception time is Vr and the set voltage is Vo, the set voltage Vo is set to establish a relation of "Vs>Vo≧(Vs/2+Vr/2)." If the ripple Vr of the reference voltage is in the order of 10% of the voltage variation width Vs, the voltage value in the order of 0.55 to 0.7 times the voltage variation width Vs, as described above, may be set as the set voltage Vo.

Next, in a receiving device according to a second aspect of the invention, the potential difference limiting means may be constructed of determining means which determines whether the potential difference exceeds the set voltage and a first switch arranged between an input line of the demodulated signal to the comparator and an input line of the reference voltage to the comparator. The first switch is switched to an ON state when the potential difference exceeds the set voltage in response to the determination result of the determining means, carrying out electrical communication between the input lines.

According to the receiving device, the electrical communication between the input lines is carried out through the first switch, making it possible to limit the potential difference between the demodulated signal and the reference voltage to less than the set voltage. According to a receiving device in a third aspect of the invention, the potential difference limiting means may be constructed of determining means configured to determine whether the potential difference exceeds the set voltage and a second switch arranged between an input line of the reference voltage to the comparator and a power source line or a ground line. The second switch is switched to an ON state when the potential difference exceeds the set voltage in response to the determination result of the determining means, applying a power source voltage or a ground voltage to the input line of the reference voltage.

According to the receiving device, the power source voltage or the ground voltage is applied to the input line of the reference voltage through the second switch to rapidly increase or decrease the reference voltage, making it possible to limit the potential difference between the demodulated signal and the reference voltage to less than the set voltage.

When actually constructing the receiving device in a third aspect of the invention, the second switch is arranged between the input line of the reference voltage to the comparator and the power source line. The second switch is switched to an ON state when the potential difference is higher than the reference voltage based on the set voltage, causing the reference voltage to be rapidly increased by the power source voltage. As shown in FIG. 9C, the response time at the time the jamming signal stops, the jamming signal having a lower frequency than the object signal, or at the time of starting reception of the transmitting signal from the transmitter can be reduced.

The second switch is arranged between the input line of the reference voltage to the comparator and the ground line. The second switch is switched to an ON state when the demodulated signal is lower than the reference voltage based on the set voltage, causing the reference voltage to be rapidly decreased by the ground voltage. As shown in FIG. 9D, the response time at the time the jamming signal having a higher frequency than the object signal disappears can be reduced.

When the receiving device in the third aspect of the invention is actually constructed, the second switch is arranged either between the input line of the reference voltage to the comparator and the power source line or between the input line of the reference voltage to the comparator and the ground line. The second switch may be switched to an ON/OFF state as described above. Alternatively, the second switches are arranged between the input line of the reference voltage to the comparator and the power source line and between the input line of the reference voltage to the comparator and the ground line respectively, the respective second switches may be switched to an ON/OFF state. In consequence, the response time until the data can be received at the reception start or when the jamming signal stops can be securely reduced.

Next, according to a receiving device in a fourth aspect of the invention, the determining means may be constructed to be capable of changing the set voltage used for determination of the potential difference. According to the receiving device, even in a system where the frequency variation width of the object signal differs, the set voltage is changed in accordance with the voltage variation width generated when the FM detector FM-demodulates the object signal, thus making it possible to accurately binarize the demodulated signal without response delay.

On the other hand, according to a receiving device in a fifth aspect of the invention, the potential difference limiting means may be constructed of a diode arranged between an input line of the demodulated signal to the comparator and an input line of the reference voltage to the comparator.

Accordingly, if an anode of the diode in the receiving device is connected to the input line of the demodulated signal and a cathode of the diode is connected to the input line of the reference voltage, when the demodulated signal is higher than the reference voltage based on the forward voltage (Vf) of the diode, Vf being about 0.6V, the current flows through the diode from the input line of the demodulated signal to the input line of the reference voltage, so that the potential difference between the input lines is limited to less than the forward voltage of the diode.

If the cathode of the diode is connected to the input line of the demodulated signal and the anode of the diode is connected to the input line of the reference voltage, when the demodulated signal is lower than the reference voltage based on the forward voltage (Vf) of the diode, Vf being about 0.6V, the current flows through the diode from the input line of the reference voltage to the input line of the demodulated signal, so that the potential difference between the input lines is limited to less than the forward voltage of the diode.

According to the receiving device in the fifth aspect of the invention, the set voltage is fixed to the forward voltage Vf of the diode, but the potential difference between the demodulated signal and the reference voltage is limited to less than the set voltage only by adding the diode to the conventional device, making it possible to quickly start the data reception at reception start or when the jamming signal stops.

Either one of two diodes may be adopted as the diode of the potential difference limiting means. In one diode, an anode is connected to the input line of the demodulated signal and in a different diode, an anode is connected to the input line of the reference voltage. However, both diodes may be provided as the potential difference limiting means. Consequently, the response time until the data can be received at reception start or when the jamming signal stops can be securely shortened.

According to the receiving device in a sixth aspect of the invention, an amplification circuit may be provided that amplifies the demodulated signal outputted from the FM detector and outputs the amplified demodulated signal to the smoothing circuit and the comparator. Further, the amplification circuit is constructed to be capable of changing a gain.

According to the receiving device, as a result of using the receiving device in a system where the frequency variation width of the object signal differs, even if the voltage variation width of the demodulated signal acquired when the FM detector FM-demodulates the object signal becomes a voltage value different in each system, the gain of the amplification circuit is changed for each system, thus making it possible for the voltage variation width of the demodulated signal to be equal between the systems.

According to a receiving device in a sixth aspect of the invention, as in the case of the receiving device in the fourth aspect, even in a system where the frequency variation width of the object signal differs greatly, the demodulated signal can be accurately binarized without response delay.

A receiving device in the sixth aspect of the invention can further be combined with the receiving device in the fourth aspect of the invention, whereby the gain of the amplification circuit and the set voltage of the determining means may be changed as needed in accordance with the system using the receiving device.

BRIEF DESCRIPTION OF THE DRAWINGS

Other objects, features, and advantages of the invention will become more apparent from the following detailed description made with reference to the accompanying drawings, in which like portions are designated by like reference numbers and in which.

DETAILED DESCRIPTION OF THE EXEMPLARY EMBODIMENTS

Hereinafter, an embodiment of the invention and various modifications, alternative embodiments and the like, will be explained with reference to the drawings. The receiving device of the present embodiment is incorporated in an in-vehicle device of a keyless entry system for an automobile, for example as shown in the block diagram of FIG. 1. The receiving device is used to receive a transmitted electric wave transmitted from a mobile device carried by a vehicle passenger and to recover control data such as an identification code specific to the mobile device and a command code for providing an instruction to lock/unlock a door from the received signal.

Figure 1:
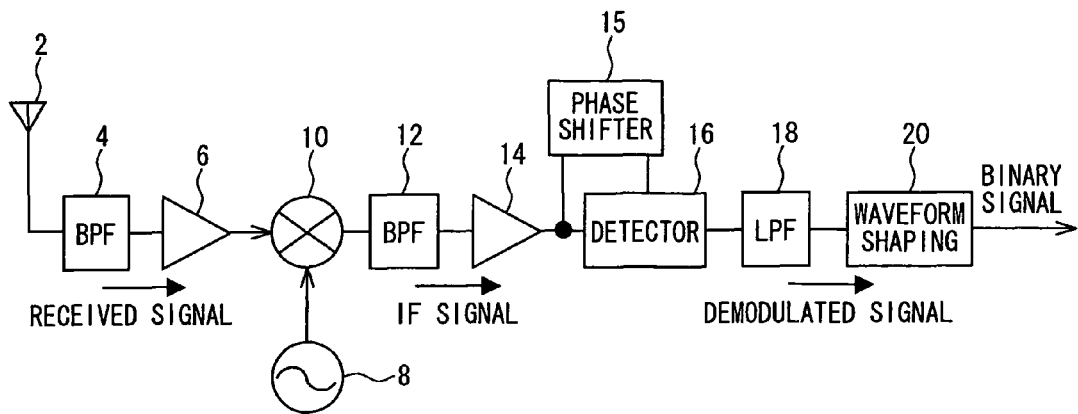
FIG. 1 is a block diagram illustrating construction of an exemplary receiving device in accordance with an embodiment of the invention.

The receiving device of the present embodiment uses a super heterodyne method for reception. The receiving device is, as shown in FIG. 1, provided with antenna 2 received a transmitted electric wave from the mobile device, a band pass filter (BPF) 4 through which only a signal among the received signals from the antenna 2 having a frequency corresponding to the band of the transmitted signal from the mobile device is selectively allowed to pass, an amplification circuit 6 amplifying the received signal passing through the BPF 4, a mixer 10 mixing the received signal amplified at the amplification circuit 6 with an oscillation signal of a constant frequency outputted from an oscillation circuit 8 to convert the received signal into an intermediate frequency (IF) signal of a fixed frequency such as, for example, 10.7 MHz, a band pass filter (BPF) 12 through which only the IF signal that is frequency-converted by the mixer 10 can selectively pass, and an amplification circuit 14 for amplifying the IF signal passing the BPF 12.

The IF signal that is amplified at the amplification circuit 14 is inputted to a phase shifter 15 to be phase-adjusted. The IF signal is also inputted to a detector 16 together with the phase-adjusted version of the IF signal, thereby carrying out the FM demodulation of the IF signal. The phase shifter 15 and the demodulator 16 constitute a FM detector of a quadrature system and a voltage signal corresponding to a frequency of the IF signal is outputted as the demodulated signal from the demodulator 16.

The demodulated signal passes through a low pass filter (LPF) 18 for eliminating a high-frequency noise component and is inputted to a waveform shaping circuit 20. The demodulated signal is then binarized. It should be noted that binarization refers to a signal being converted into a binary signal. The binarized demodulated signal corresponds to the control data at the waveform shaping circuit 20 that is outputted to a control device for controlling the locking/unlocking of a vehicle door.

Figure 2:
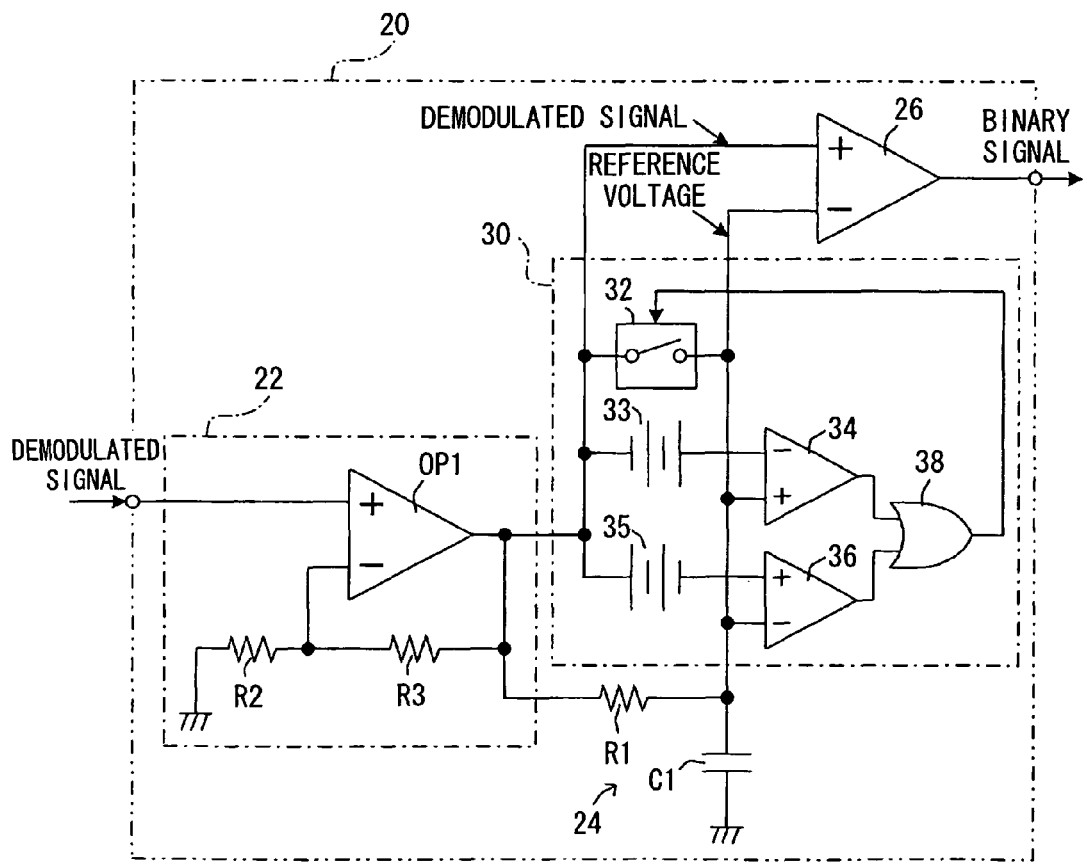
FIG. 2 is a circuit diagram illustrating operation of an exemplary waveform shaping circuit in an embodiment.

The circuit diagram of FIG. 2 shows the construction of the waveform shaping circuit 20. A shown, the waveform shaping circuit 20 of the present embodiment is constructed of an amplification circuit such as a gain amplifier 22 for amplifying the demodulated signal passing through the LPF 18, a smoothing circuit 24 for smoothing the demodulated and amplified signal to generate a reference voltage for binarization, a comparator 26 for comparing the reference voltage for binarization with the demodulated and amplified signal, and a potential difference limiting circuit 30 for limiting a potential difference between the demodulated and amplified signal inputted into the comparator 26 and the reference voltage to less than a set voltage.

The gain amplifier 22 is constructed of a non-inverting amplification circuit. In the non-inverting amplification circuit, an inverting input terminal of an operational amplifier OP1 is grounded by a connection to the ground line through a resistance R2 and the inverting input terminal and an output terminal are connected through a resistance R3 to input the demodulated signal to the non-inverting input terminal, thus amplifying the demodulated signal with a constant gain that can be determined according to the relation 1+R3/R2.

The comparator 26 is also constructed of an operational amplifier where the demodulated signal is received at the non-inverting input terminal and the reference voltage is received at the inverting input terminal. Thereby, the comparator 26 generates a binary signal that becomes a high level when the demodulated signal is higher than the reference voltage and becomes a low level when the demodulated signal is less than the reference voltage.

Figure 9A:
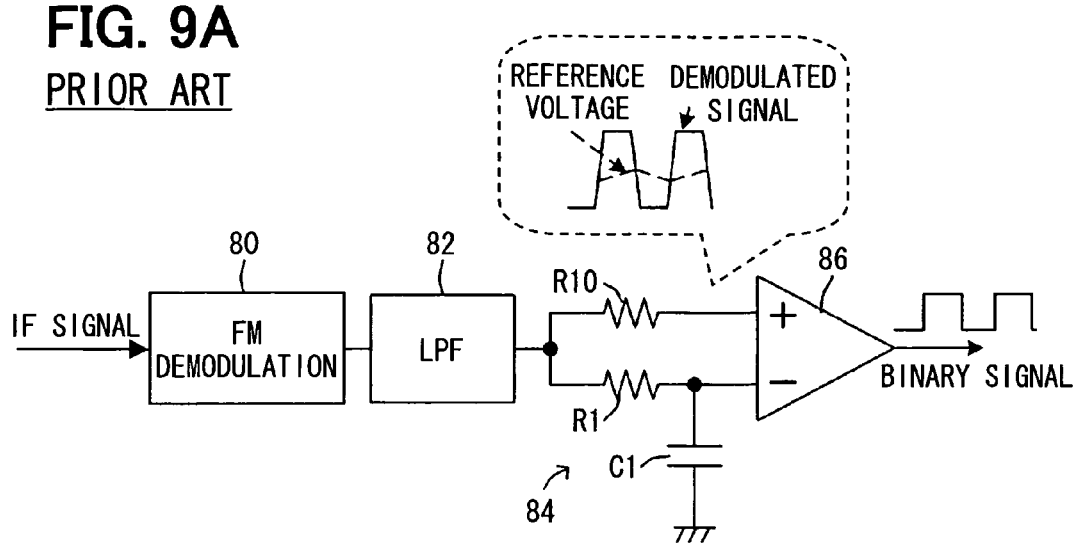
FIG. 9A is a diagram illustrating construction of a conventional receiving device and associated disadvantages.
Figure 9B:
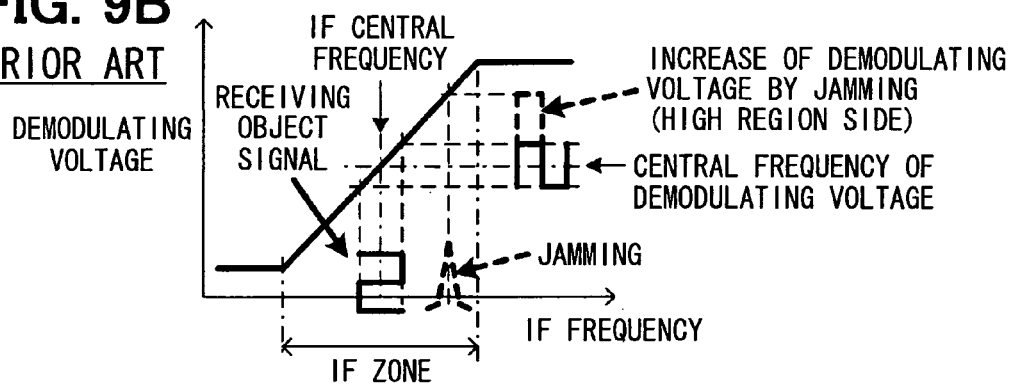
FIG. 9B is a diagram further illustrating construction of a conventional receiving device and associated disadvantages.
Figure 9C:
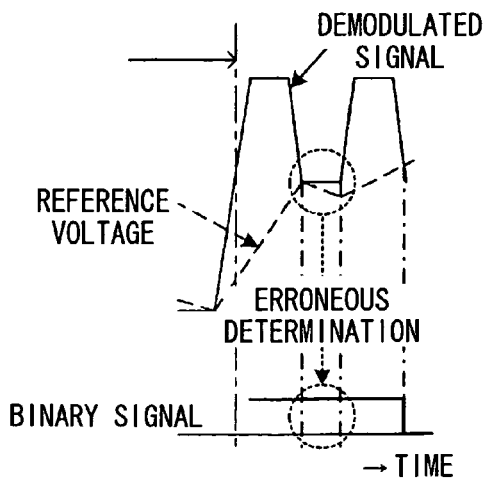
FIG. 9C is a diagram further illustrating construction of a conventional receiving device and associated disadvantages.
Figure 9D:
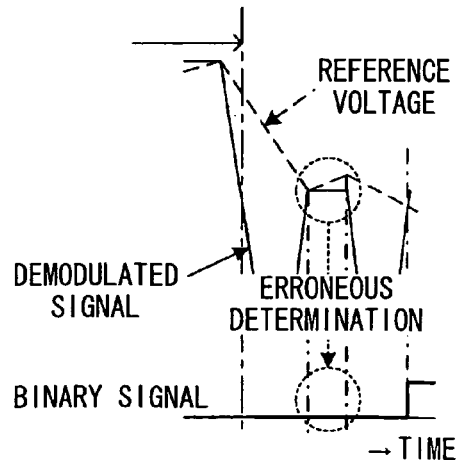
FIG. 9D is a diagram further illustrating construction of a conventional receiving device and associated disadvantages.

The smoothing circuit 24, as in thee case of the conventional device shown in FIG. 9A, is constructed of an integrating circuit including a resistance R1 and a capacitor C1. The demodulated signal is integrated according to a given time constant determined by a resistance value of the resistance R1 and a capacity of the capacitor C1 to generate the reference voltage.

The potential difference limiting circuit 30 is constructed of the following elements. A first element is a switch 32 arranged between an input line of the demodulated signal to the comparator 26 and an input line of the reference voltage to the comparator 26 for carrying out connection/disconnection between the input lines. A second element is a comparator 34 which incorporates the demodulated signal through a voltage source 33, a negative side of which is connected to the input line of the demodulated signal to the comparator 26. The comparator 34 compares a voltage value of the incorporated signal with the reference voltage. When the reference voltage is higher than the voltage value acquired by adding a generating voltage of the voltage source 33 to the demodulated signal, the comparator 34 outputs a signal of the high level. A third element is a comparator 36 that incorporates the demodulated signal through a voltage source 35 a positive side of that is connected to an input line of the demodulated signal to the comparator 26 and compares a voltage value of the incorporated signal with the reference voltage. When the reference voltage is lower than the voltage value acquired by reducing a generating voltage of the voltage source 35 from the demodulated signal, the comparator 36 outputs a signal of the high level. A fourth element is an OR circuit 38 in which, according to logical addition of the outputs of the comparators 34 and 36, when either output of the comparators 34 and 36 reaches a high level, a signal of the high level is outputted to turn on the switch 32.

Figure 3A:
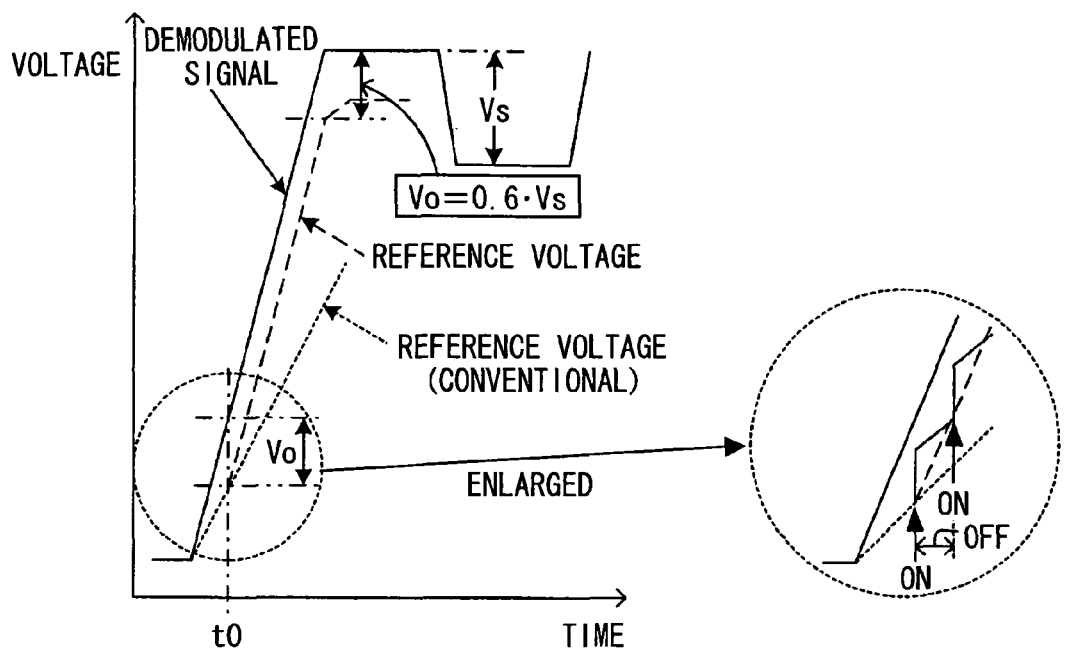
FIG. 3A is a diagram illustrating an exemplary operation of a waveform shaping circuit in an embodiment.
Figure 3B:
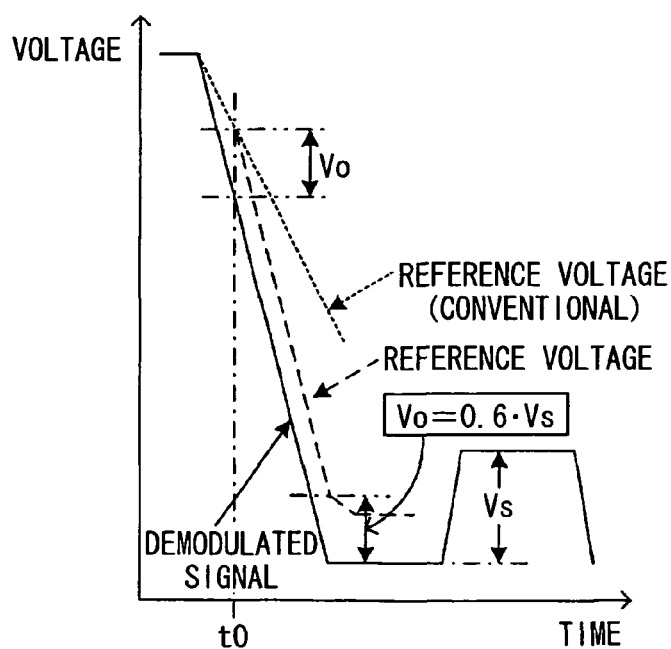
FIG. 3B is a diagram illustrating an exemplary operation of a waveform shaping circuit in an embodiment.

According to the receiving device of the present embodiment, as shown in FIG. 3A, when the jamming signal having a frequency lower than the object signal stops or when the reception of the transmitted electric wave from the mobile device starts, the voltage value of the demodulated signal rapidly increases. Therefore, the reference voltage is higher than a voltage acquired by adding a voltage value of the voltage source 33, which is set at voltage Vo, to the voltage value of the demodulated signal taken at point to shown in FIG. 3A. In addition, as shown in FIG. 3B, when the jamming signal having a frequency higher than the object signal stops, the voltage value of the demodulated signal rapidly decreases and therefore, the reference voltage is lower than a voltage acquired by reducing a voltage value of the voltage source 35, which is set at voltage Vo, from the voltage value of the demodulated signal taken at point to shown in FIG. 3B. When the reference voltage changes as described above, the switch 32 turns on and the capacitor C1 of the smoothing circuit 24 rapidly discharges so that the reference voltage is equal to the voltage value of the demodulated signal.

According to the receiving device of the present embodiment, the absolute value of the potential difference between the demodulated signal inputted to the comparator 26 and the reference voltage is limited to less than the set voltage Vo determined by the generating voltage of each of the power sources 33 and 35 causing the response time until the control data can be normally received at reception start or when the jamming signal stops to be shortened, thus quickly starting the data reception.

According to the receiving device of the present embodiment, when the potential difference between the reference voltage and the demodulated signal is less than the set voltage Vo, since the reference voltage is supposed to be generated by the smoothing circuit 24 as in the case of the conventional device, by increasing the time constant of the smoothing circuit 24, a ripple of the reference voltage used at normal reception is restricted, thus making it possible to secure accurate recovery of the binary data signal.

In the present embodiment, assuming that the ripple of the reference voltage generated at the smoothing circuit 24 during normal reception is in the order of b 10% of the voltage variation width (i.e., magnitude) Vs of the demodulated signal in the object signal, the generating voltage of the power sources 33 and 35, which corresponds to the set voltage Vo, is set to about 0.6Vs, which is 0.6 times the voltage variation width Vs as shown and described in connection with FIG. 3.

In the present embodiment, the potential difference limiting circuit 30 can correspond to potential difference limiting means. Among them, the voltage source 33, the comparator 34, the voltage source 35, the comparator 36 and the OR circuit 38 correspond to the determining means and the switch 32 corresponds to the switch.

The switch 32 may be a semiconductor switch or a relay switch that can be switched to an ON state by a power supply. In the above description, one embodiment of the invention is explained, but the invention is not limited to the one embodiment and can be adapted in accordance with various modifications intended to fall within the scope of the invention.

[First Modification]

For example, in the above described embodiment, it is explained that in the potential difference limiting circuit 30, the set voltage Vo used for determination of the potential difference is generated by simply using the voltage sources 33 and 35. However, it should be understood that voltage sources 33 and 35 are not used like a battery. For example, as shown in FIG. 4, a resistance R4 and a resistance R5 respectively may be arranged in input lines of the demodulated signal to the comparators 34 and 36, and a constant current source 42 supplying the current and a constant current source 44 pulling in the current may be provided to the sides of the comparators 34 and 35 of the resistances R4 and R5.

The constant current flows in the resistance R4 from the side of the comparator 34 to the input side of the demodulated signal and therefore, the input potential of the demodulated signal to the comparator 34 increases by an amount corresponding to the voltage reduction at the resistance R4 higher than the demodulated signal inputted to the comparator 26. In reverse, the constant current flows in the resistance R5 to the side of the comparator 34 from the input side of the demodulated signal and therefore, the input potential of the demodulated signal to the comparator 36 decreases by an amount corresponding to the voltage reduction at the resistance R5 lower than the demodulated signal inputted to the comparator 26.

Figure 4:
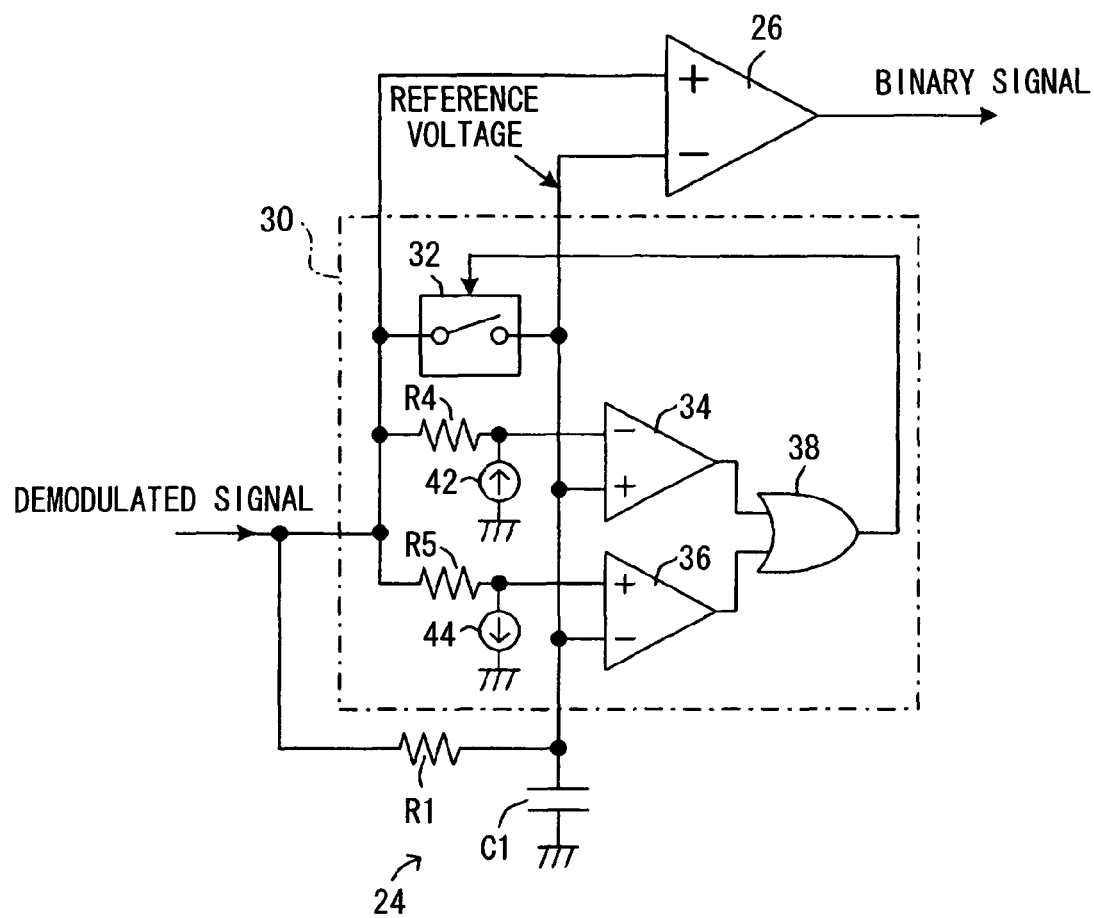
FIG. 4 is a circuit diagram illustrating construction of an exemplary potential difference limiting circuit in a first modification.

According to the potential difference limiting circuit 30 of the first modification shown in FIG. 4, the set voltage Vo is generated at both terminals of the resistances R4 and R5, making it possible to limit the absolute value of the potential difference between the demodulated signal and the reference voltage to less than the set voltage Vo. Therefore, an effect similar to that in the main embodiment can be achieved.

[Second Modification]

Figure 5:
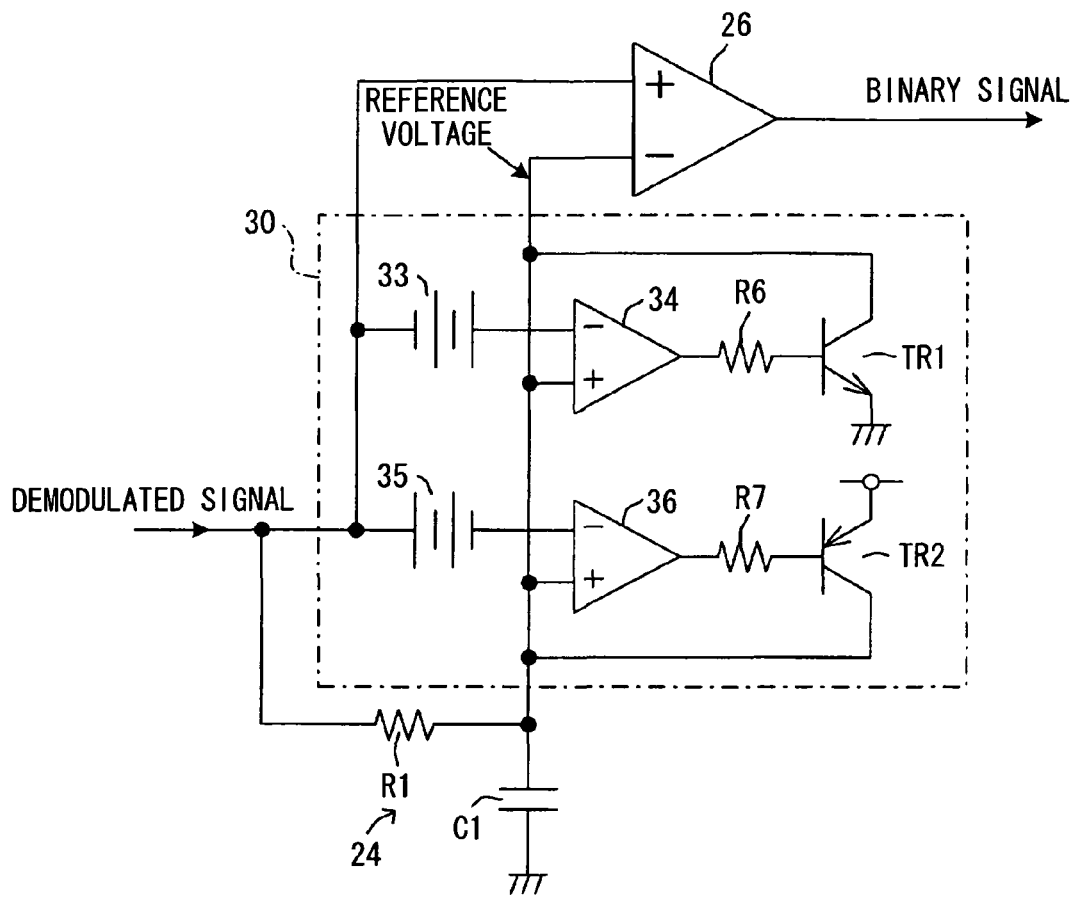
FIG. 5 is a circuit diagram illustrating construction of an exemplary potential difference limiting circuit in a second modification.

In the embodiment, it is explained that the switch 32 is arranged between the input line of the demodulated signal to the comparator 26 and the input line of the reference voltage to the comparator 26 and upon turning on the switch 32, the potential difference between the demodulated signal and the reference voltage is limited to less than the set voltage Vo. However, for example, as shown in FIG. 5, the second modification may be provided with, in place of the switch 32, a NPN transistor TR1 in which an emitter is earthed to a ground line, a resistance R6 connecting the output of the comparator 34 to a base of the transistor TR1, a PNP transistor TR2 in which an emitter is connected to a power source line and a resistance R7 connecting the output of the comparator 36 to a base of the transistor TR2. Collectors of the transistors TR1 and TR2 are connected to the input line of the reference voltage to the comparator 26 and also the output level of the comparator 36 is reversed to the above embodiment.

When the reference voltage is higher than the voltage value acquired by adding the set voltage Vo to the demodulated signal, the transistor TR1 is switched to an ON state by, for example, a high level on the output of the comparator 34 and the capacitor C1 of the smoothing circuit 24 is discharged. In reverse, when the reference voltage is lower than the voltage value acquired by reducing the set voltage Vo from the demodulated signal, the transistor TR2 is switched to an ON state by, for example, a low level on the output of the comparator 34 and the capacitor C1 of the smoothing circuit 24 is charged by the power source voltage.

As a result, according to the potential difference limiting circuit 30 of the second modification shown in FIG. 5, when the potential difference between the demodulated signal and the reference voltage exceeds the set voltage Vo, the power source voltage or the ground voltage is applied to the input line of the reference voltage to the comparator 26. The absolute value of the potential difference between the reference voltage and the demodulated signal is controlled to less than the set voltage Vo. Therefore, an effect similar to that in the main embodiment can be achieved.

[Third Modification]

Figure 6:
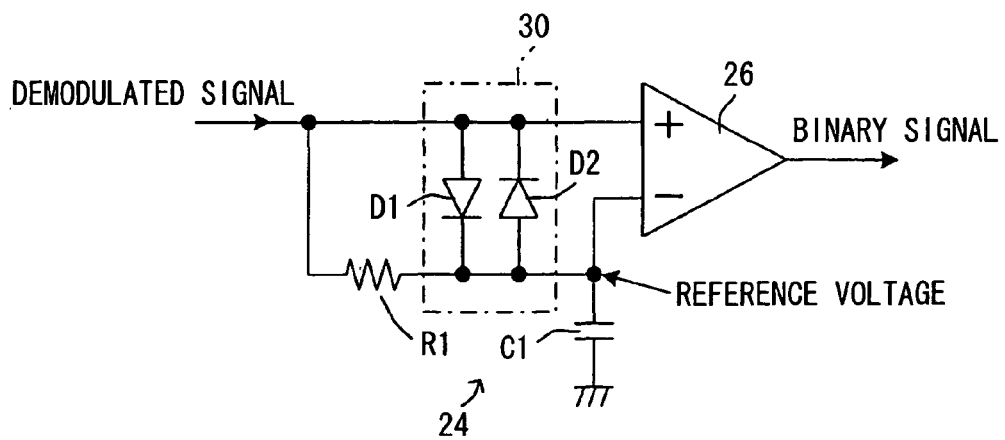
FIG. 6 is a circuit diagram illustrating construction of an exemplary potential difference limiting circuit in a third modification.

The potential difference limiting circuit 30 may be, as shown in FIG. 6, constructed of two diodes D1 and D2.

That is, in the potential difference limiting circuit 30 shown in FIG. 6, an anode of the diode D1 is connected to the input line of the demodulated signal to the comparator 26 and a cathode thereof is connected to the input line of the reference voltage to the comparator 26. Therefore, when the reference voltage is lower than the demodulated signal by an amount that exceeds the forward voltage Vf of the diode D1 of about 0.6V, the current flows through the diode D1, so that the potential difference between the reference voltage and the demodulated signal, the difference corresponding to the value of the demodulated signal minus the value of the reference voltage, can be limited to less than the forward voltage Vf of the diode D1.

In the potential difference limiting circuit 30 shown in FIG. 6, an anode of the diode D2 is connected to the input line of the reference voltage to the comparator 26 and a cathode thereof is connected to the input line of the demodulated signal to the comparator 26. Therefore, when the reference voltage is higher than the demodulated signal by an amount exceeding the forward voltage Vf of the diode D2, the current flows through the diode D2, so that the potential difference between the reference voltage and the demodulated signal corresponding to the value of the reference voltage minus the value of the demodulated signal, can be limited to less than the forward voltage Vf of the diode D2.

As a result, according to the potential difference limiting circuit 30 of the third modification shown in FIG. 6, the absolute value of the potential difference between the reference voltage and the demodulated signal can be controlled to less than the set voltage Vo or to a value equal to Vf. Therefore, an effect similar to that in the main embodiment can be achieved.

It should be noted that according to the potential difference limiting circuit 30 of the third modification shown in FIG. 6, only one of the diodes D1 and D2 may be provided. That is, in a case of providing the diode D1, since the potential difference when the demodulated signal is higher than the reference voltage can be controlled to less than the set voltage Vo or to a value equal to Vf, when the jamming signal having a frequency higher than the object signal stops, the reference voltage is made to follow the demodulated signal to shorten the response time at that point. In reverse, in a case of providing the diode D2, since the potential difference when the reference voltage is higher than the demodulated signal can be controlled to less than the set voltage Vo or to a value equal to Vf, at the time of reception start or when the jamming signal having a frequency lower than the object signal disappears, the reference voltage is made to follow the demodulated signal to shorten the response time at that point.

Likewise, in the embodiment and the first and second modifications, by using only one of the two comparators 34 and 36, the absolute value of the potential difference between the reference voltage and the demodulated signal may be controlled to less than the set voltage Vo or to a value equal to Vf.

(Fourth Modification)

Figure 7:
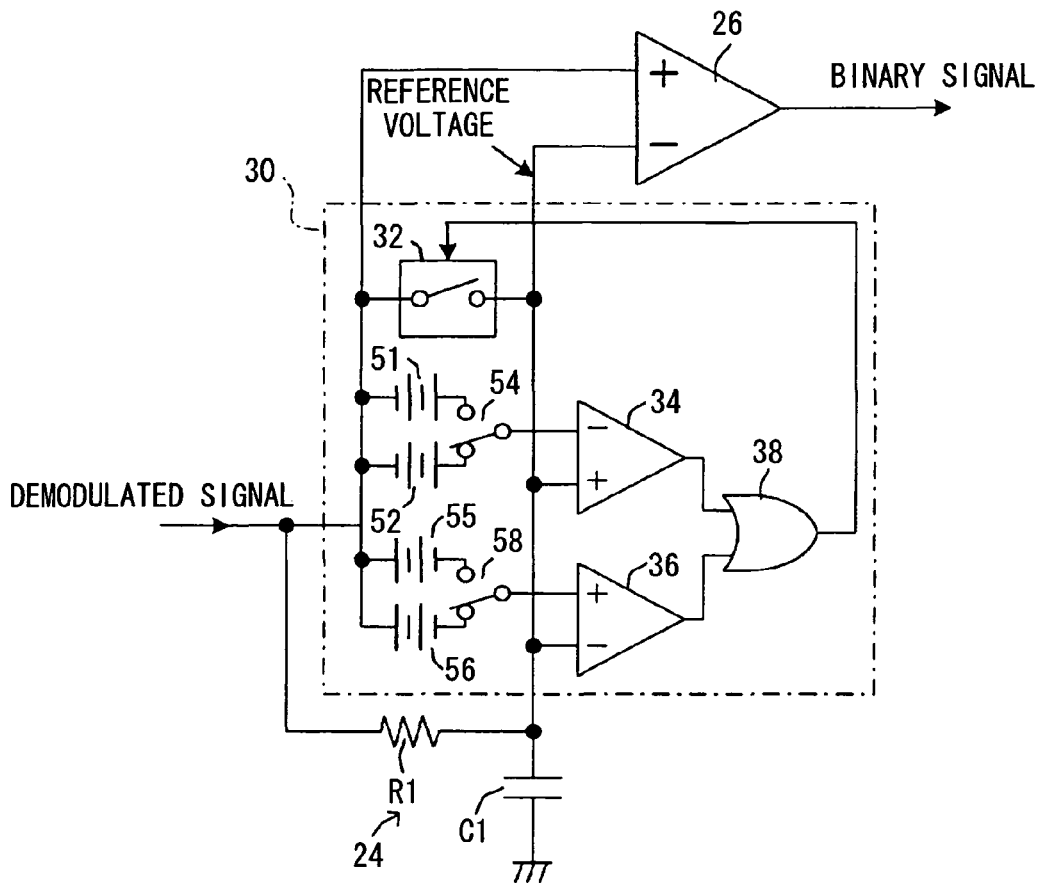
FIG. 7 is a circuit diagram illustrating construction of an exemplary potential difference limiting circuit in a fourth modification.

It should be noted that in the main embodiment and the first to third modifications, the set voltage Vo is a fixed value, but, for example, as shown in FIG. 7, a pair of voltage sources 51 and 52 and a pair of voltage sources 55 and 56 may be provided, each pair having a different generating voltage may be provided in place of the voltage sources 33 and 35 in the embodiment. The pair of generating voltages to be used is changed through switches 54 and 58.

According to the above described construction, the receiving device can be shared, for example, in a keyless entry system for an automobile and in another system where a carrier wave is modulated in frequency by a frequency variation width different from that of the keyless entry system such as, more specially, tire air-pressure monitoring system or the like. Therefore, an application of the receiving device can be expanded.

It should be noted that the number of voltage sources that can change the set voltage Vo may be three or more. Further, any voltage value may be set as the set voltage Vo by using a variable voltage source.

[Fifth Modification]

Figure 8:
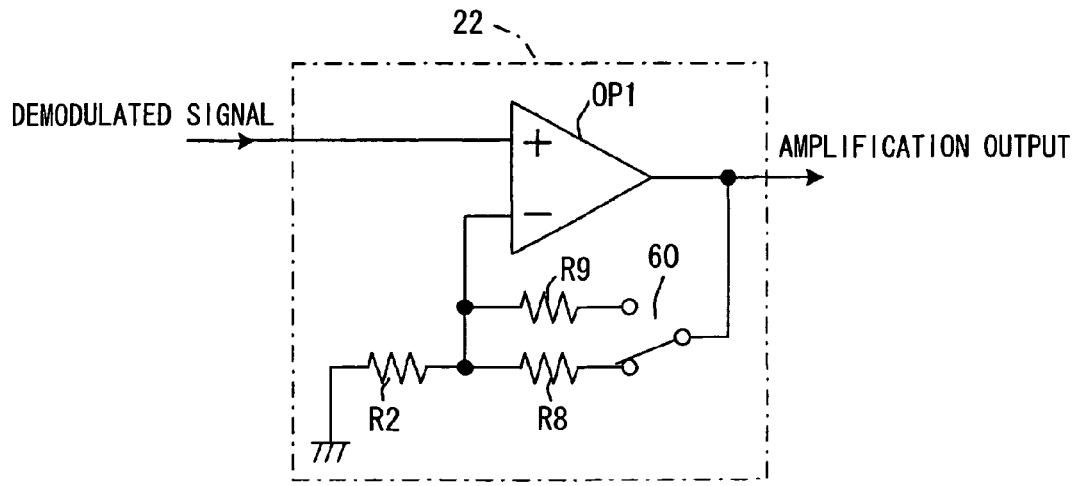
FIG. 8 is a circuit diagram illustrating construction of an exemplary gain amplifier in a fifth modification.

As in the case of the fourth modification, the receiving device can be used in plural systems in accordance with a fifth modification, for example, as shown in FIG. 8. A resistance, such as resistance R3 of the main embodiment that is connected to a feedback path between the inverting input terminal and the output terminal of the operational amplifier OP1 constituting the gain amplifier 22 may be formed of plural resistances R8 and R9. One of the resistances R8 and R9 can be selectively connected to the feedback path.

A gain of the gain amplifier 22 can be changed by using the resistances R8 and R9. The changeable gain corresponding to the respective resistances of the resistances R8 and R9 can be adjusted as needed, so that the voltage variation width (i.e., magnitude) acquired by FM-demodulating the object signal can be made equal between different systems. Thus the potential difference between the demodulated signal and the reference voltage can be controlled at the potential difference limiting circuit 30 at the later stage appropriately.

While only selected embodiments have been chosen to illustrate the invention, it will be apparent to those skilled in the art from the present disclosure that various changes and modifications can be made therein without departing from the scope of the invention as defined in the appended claims. Furthermore, the foregoing description of the embodiments according to the invention is provided for illustration only, and not for the purpose of limiting the invention as defined by the appended claims and their equivalents.

What is claimed is:

1. A receiving device comprising:
   a frequency modulation (FM) detector for FM-demodulating a received signal to form a demodulated signal;
   a smoothing circuit for smoothing the demodulated signal to generate a reference voltage; and
   a waveform shaping circuit including:
      a comparator comparing the reference voltage with the demodulated signal so as to binarize the demodulated signal; and
      potential difference limiting means for limiting a potential difference between the demodulated signal and the reference voltage to less than a set voltage which is set based upon a variation in signal voltage magnitude of demodulated signal for an object signal contained in the received signal;
   wherein the potential difference limiting means includes a diode arranged between a first input line inputting the demodulated signal to the comparator and a second input line inputting the reference voltage to the comparator.

2. A receiving device according to claim 1, wherein the potential difference limiting means includes:
   determining means for determining whether the potential difference exceeds the set voltage; and
   a switch arranged between an input line of the demodulated signal to the comparator and an input line of the reference voltage to the comparator,
   wherein, in response to a result of the determining by the determining means, the switch is switched to an OFF state when the potential difference is below the set voltage and the switch is switched to an ON state when the potential difference exceeds the set voltage.

3. A receiving device according to claim 1, wherein the potential difference limiting means includes:
   determining means for determining whether the potential difference exceeds the set voltage; and
   a switch arranged between an input line of the reference voltage to the comparator and one of a power source line and a ground line,
   wherein, in response to the determination result of the determining means, the switch is switched to an OFF state when the potential difference is below the set voltage and the switch is switched to an ON state when the potential difference exceeds the set voltage.

4. A receiving device according to claim 1, further comprising:
   an amplification circuit amplifying the demodulated signal to form an amplified demodulated signal and outputting the amplified demodulated signal to the smoothing circuit and the comparator,
   wherein the amplification circuit is configured to change a gain thereof to adjust the magnitude of voltage variation.

5. A receiving device according to claim 2, wherein the determining means is configured to change the set voltage in accordance with the magnitude of demodulated signal voltage variation.

6. A receiving device according to claim 3, wherein the determining means is configured to change the set voltage in accordance with the magnitude of demodulated signal voltage variation.

7. A receiving device for recovering an object signal from a received signal, the object signal modulated according to a magnitude of frequency variation between a first object frequency and a second object frequency in a frequency zone, the received signal being susceptible to a jamming signal having a jamming frequency in the frequency zone, the device comprising:
   a frequency modulation (FM) detector for FM-demodulating the received signal in the frequency zone to form a demodulated signal;
   a smoothing circuit for smoothing the demodulated signal according to a time constant to generate a reference voltage associated with the first object frequency, the second object frequency and, when present, the jamming frequency; and
   a waveform shaping circuit including:
      a comparator comparing the reference voltage with the demodulated signal so as to binarize the demodulated signal; and
      potential difference limiting means for limiting a potential difference between the demodulated signal and the reference voltage to less than a set voltage, the set voltage being set based on a variation in signal voltage magnitude of demodulated signal associated with the object signal only, the variation in demodulated signal voltage being based on the magnitude of object signal frequency variation;
   wherein the potential difference limiting means includes a diode arranged between a first input line inputting the demodulated signal to the comparator and a second input line inputting the reference voltage to the comparator.

8. A receiving device according to claim 7, wherein the potential difference limiting means includes:
   determining means for determining whether the potential difference exceeds the set voltage; and
   a switch arranged between an input line of the demodulated signal to the comparator and an input line of the reference voltage to the comparator,
   wherein the switch is switched to an OFF state when the potential difference is below the set voltage, and the switch is switched to an ON state when the potential difference exceeds the set voltage.

9. A receiving device according to claim 7, wherein the potential difference limiting means includes:
   determining means for determining whether the potential difference exceeds the set voltage; and
   a switch arranged between an input line of the reference voltage to the comparator and one of a power source line and a ground line,
   wherein, in response to the determination result of the determining means, the switch is switched to an OFF state when the potential difference is below the set voltage and the switch is switched to an ON state when the potential difference exceeds the set voltage.

10. A receiving device according to claim 7, further comprising:
   an amplification circuit amplifying the demodulated signal to form an amplified demodulated signal and outputting the amplified demodulated signal to the smoothing circuit and the comparator,
   wherein the amplification circuit is configured to change a gain thereof to adjust the magnitude of voltage variation.

11. A receiving device according to claim 10, wherein the determining means is configured to change the set voltage in accordance with the adjusting the magnitude of voltage variation.

* * * * *